(12) United States Patent
Huang et al.

(10) Patent No.: US 10,620,427 B2
(45) Date of Patent: Apr. 14, 2020

(54) OPTICAL MAGNIFYING COMBINATION LENS, HEAD-MOUNTED OPTICAL DISPLAY SYSTEM AND VIRTUAL REALITY DISPLAY DEVICE

(71) Applicant: IDEALENS TECHNOLOGY (CHENGDU) CO., LTD., Chengdu, Sichuan (CN)

(72) Inventors: Qinhua Huang, Sichuan (CN); Haitao Song, Sichuan (CN); Zhaoquan Ren, Sichuan (CN)

(73) Assignee: Chengdu Lixiang Zhimei Technology Co., Ltd., Chengdu, Sichuan (CN)

( * ) Notice: Subject to any disclaimer, the term of this patent is extended or adjusted under 35 U.S.C. 154(b) by 392 days.

(21) Appl. No.: 15/555,555

(22) PCT Filed: Oct. 28, 2015

(86) PCT No.: PCT/CN2015/093082
§ 371 (c)(1),
(2) Date: Sep. 5, 2017

(87) PCT Pub. No.: WO2016/141720
PCT Pub. Date: Sep. 15, 2016

(65) Prior Publication Data
US 2018/0039069 A1    Feb. 8, 2018

(30) Foreign Application Priority Data

Mar. 6, 2015  (CN) .......................... 2015 1 0100334
Mar. 6, 2015  (CN) ..................... 2015 2 0130390 U (Continued)

(51) Int. Cl.
G02B 25/00      (2006.01)
G02B 25/04      (2006.01)
(Continued)

(52) U.S. Cl.
CPC ............ *G02B 25/008* (2013.01); *G02B 1/041* (2013.01); *G02B 3/08* (2013.01); *G02B 13/16* (2013.01);
(Continued)

(58) Field of Classification Search
CPC .. G02B 25/008; G02B 27/0172; G02B 25/04; G02B 25/004; G02B 13/18; G02B 13/16;
(Continued)

(56) References Cited

U.S. PATENT DOCUMENTS 5,798,739 A * 8/1998 Teitel ................. G02B 27/0172
                                                          345/32
2016/0223815 A1* 8/2016 Dobschal ................ C03B 11/08

* cited by examiner

*Primary Examiner* — William R Alexander
*Assistant Examiner* — Henry A Duong

(57) ABSTRACT

An optical magnifying combination lens, a head-mounted optical display system and a virtual reality display device are provided, wherein the optical magnifying combination lens is for utilization in a head-mounted virtual reality display device, comprising: a central area (A) and a peripheral area (B), wherein the central area (A) is a convex lens or a combination convex lens, and the peripheral area (B) is a focusing thin optical element; the central area (A) corresponds to main visual field imaging, and the peripheral area (B) corresponds to peripheral visual field imaging. The optical magnifying combination lens guarantees center image quality and enlarges edge view of human eyes, so as to enhance user immersion feelings.

20 Claims, 11 Drawing Sheets

(30) Foreign Application Priority Data

Jun. 23, 2015 (CN) .......................... 2015 1 0349605
Jun. 23, 2015 (CN) .................... 2015 2 0434143 U

(51) Int. Cl.
*G02B 27/01* (2006.01)
*G02B 1/04* (2006.01)
*G02B 3/08* (2006.01)
*G02B 13/16* (2006.01)
*G02B 13/18* (2006.01)

(52) U.S. Cl.
CPC ........... *G02B 13/18* (2013.01); *G02B 25/004* (2013.01); *G02B 25/04* (2013.01); *G02B 27/0172* (2013.01); *G02B 2027/0132* (2013.01)

(58) Field of Classification Search
CPC .. G02B 3/08; G02B 1/041; G02B 2027/0132; G02B 21/18; G02B 21/20; G02B 23/00; G02B 23/18; G02B 25/00; G02B 25/002
USPC ......................................................... 359/480
See application file for complete search history.

 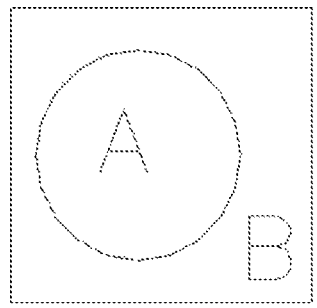 
Fig. 3a    Fig. 3b    Fig. 3c
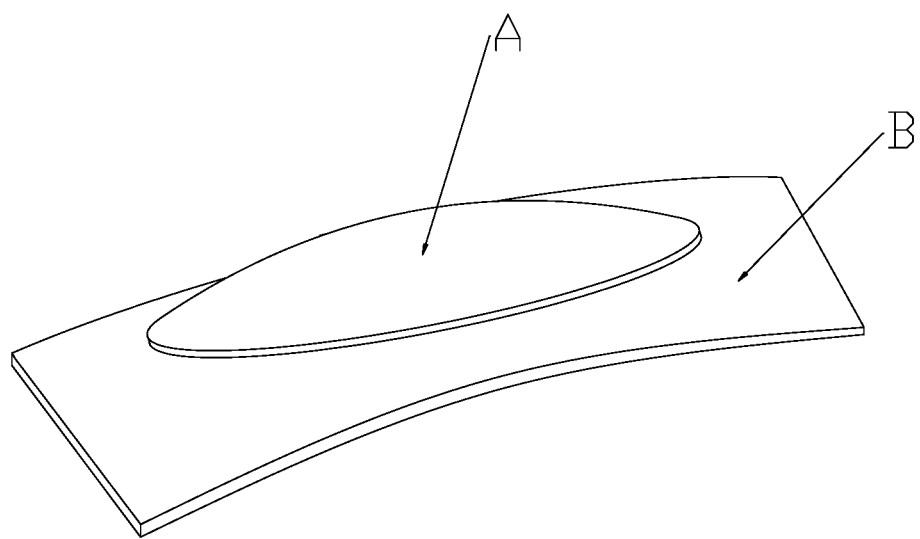
Fig. 4

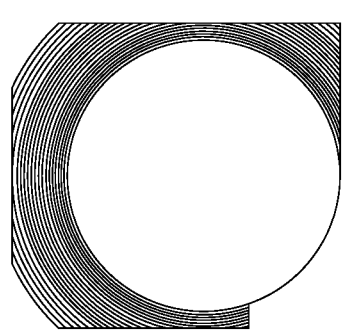
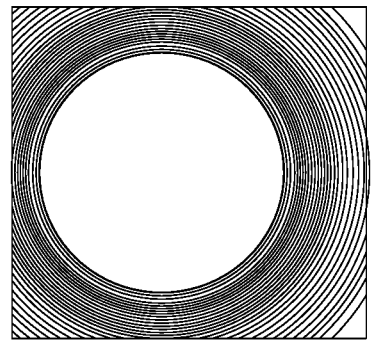
Fig. 5aFig. 5b
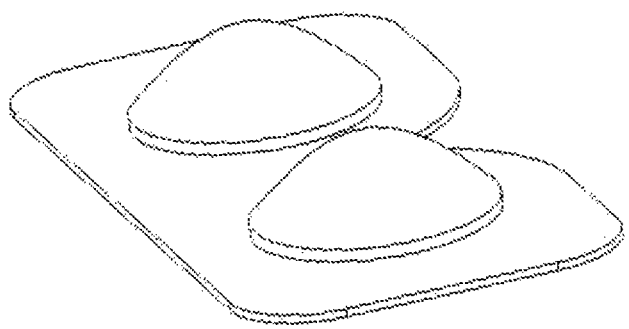
Fig. 6
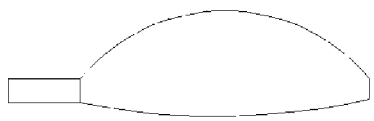
Fig. 7aFig. 7b

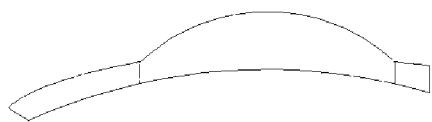
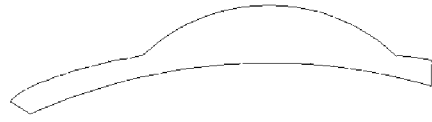
Fig. 8a  Fig. 8b
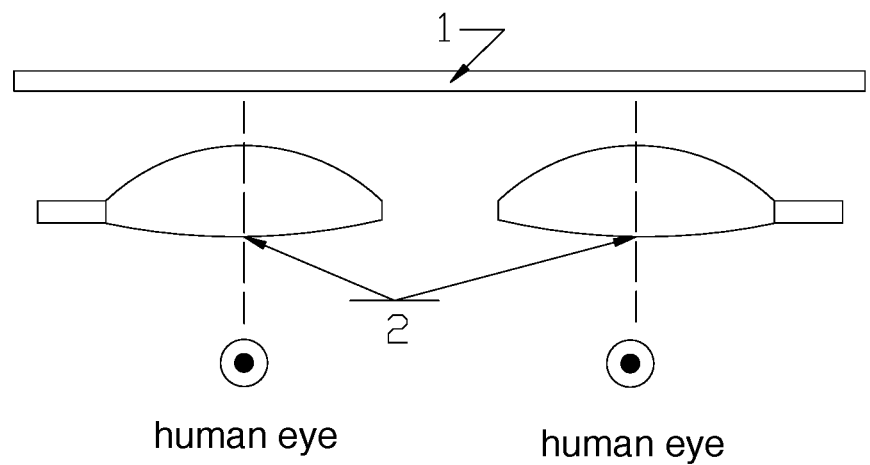
Fig. 9

OPTICAL MAGNIFYING COMBINATION LENS, HEAD-MOUNTED OPTICAL DISPLAY SYSTEM AND VIRTUAL REALITY DISPLAY DEVICE

CROSS REFERENCE OF RELATED APPLICATION

This is a U.S. National Stage under 35 U.S.C 371 of the International Application PCT/CN2015/093082, filed Oct. 28, 2015, which claims priority under 35 U.S.C. 119(a-d) to CN 201510100334.0, filed Mar. 6, 2015; CN 201520130390.4, filed Mar. 6, 2015; CN 201510349605.6, filed Jun. 23, 2015; CN 201520434143.3, filed Jun. 23, 2015.

BACKGROUND OF THE PRESENT INVENTION

Field of Invention

The present invention relates to the optical field, and more particularly to an optical amplification combined lens applied on a head-mounted display device and the head-mounted display optical system and the head-mounted virtual reality display device with the optical amplification combined lens.

Description of Related Arts

The optical amplification elements of the head-mounted virtual reality display system adopt the conventional lens, such as the spherical lens, aspheric lens or free-form optical lens etc. Being limited by the optical processing techniques and the optical material, the diameter of the optical amplification lens is normally small (due to big-diameter lens significantly increases the weight and volume of the optical system). The field of vision of the user through the optical amplification lens set is limited by the diameter of the amplification lens set. The field of vision through the amplification lens set is smaller than the field of vision of the human eyes in natural state. The visual impact for and immersion of the human eyes are significantly affected by the limited field of vision through the image display system. To enlarge the field of vision through the head-mounted virtual reality display system while the small volume and light weight of the head-mounted device are ensured is a problem need to be solved.

SUMMARY OF THE PRESENT INVENTION

An object of the present invention is to increase a virtual field of a head-mounted virtual reality display system based on that the head-mounted device is small and light enough. Accordingly, in order to accomplish the above object, an preferred embodiment of the present invention provides an optical magnifying combination lens for utilization in a head-mounted virtual reality display device, comprising: a central area and a peripheral area, wherein the central area is a convex lens or a combination convex lens, and the peripheral area is a focusing thin optical element which is a focusing optical element with a diameter-thickness ratio of no less than 10; the central area corresponds to main visual field imaging, and the peripheral area corresponds to peripheral visual field imaging.

According to the preferred embodiment, the convex lens is a spherical lens, an aspheric lens, or a free-form surface optical lens; and/or the focusing thin optical element is a Fresnel lens, a Fresnel zone plate or a binary element.

According to the preferred embodiment, the peripheral area is an arc substrate Fresnel lens which is concave towards human eyes.

According to the preferred embodiment, a curvature radius of the arc substrate Fresnel lens coincides with a curvature radius of a near-eye side optical surface of the central area.

According to the preferred embodiment, the convex lens is an aspheric lens; and/or the peripheral area is a flat substrate Fresnel lens; wherein one side of the peripheral area is a smooth surface and the other side is engraved with concentric sawtooth rings.

According to the preferred embodiment, a focal length difference between the central area and the peripheral area is no more than 10 mm.

According to the preferred embodiment, an achromatic pattern is engraved on a surface of the convex lens.

According to the preferred embodiment, the central area and the peripheral area are integrally molded.

According to the preferred embodiment, the central area and the peripheral area are individual optical elements; a peripheral contour of the central area is tapered, and an interior contour of the peripheral area is tapered, so as to coincide with the peripheral contour of the central area.

According to the preferred embodiment, the central area and the peripheral area are joined together by optical bonding or mechanical combination.

According to the preferred embodiment, the optical magnifying combination lens has the central area, or two symmetric central areas.

The present invention also provides a head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited above.

According to the preferred embodiment, the optical magnifying lens group comprises two optical magnifying combination lenses stacked along an optical path.

According to the preferred embodiment, a difference between a combination focal length of central areas of the two optical magnifying combination lenses and a combination focal length of peripheral areas is no more than 10 mm.

According to the preferred embodiment, an angle formed between a line connecting an edge of each of the optical magnifying combination lens with a corresponding center point of the human eyes and a central sight line of the human eyes is 70-100 degrees.

According to the preferred embodiment, the optical magnifying lens group further comprises:

one or more intermediate optical elements, wherein the intermediate optical elements are located on a side of the optical magnifying combination lens which is far from the human eyes, and the optical information of the image display source passes through the intermediate optical elements before entering the human eyes.

According to the preferred embodiment, the intermediate optical elements comprise focusing thin optical elements or convex lenses.

The present invention also provides a head-mounted virtual reality display system, comprising: one or two groups of head-mounted optical display systems as recited above.

The present invention provides a specially designed optical magnifying combination lens which greatly enlarges the visual field of an image display system. When the optical magnifying combination lens is applied to a binocular head-mounted virtual reality display device whose image display source has a left screen and a right screen for presenting images with phase differences, the user can have a more realistic experience of the stereoscopic vision with great impact and ultimate shock effect.

Meanwhile, the present invention overcomes problems such as limitation of the visual field of the display system when the conventional lens (spherical, aspheric or free-form surface) is used alone as a magnifying lens for a head-mounted display device due to a small diameter, impaired immersion felt by the human eyes, heavy magnifying lens group, and uncomfortable wearing.

In addition, the focusing thin optical element provided by the present invention comprises a thin optical element having a focusing function, such as a Fresnel lens, a Fresnel zone plate and a binary element. These components are light but with slightly worse image quality. The present invention combines the focusing thin optical element with conventional lens, which guarantees center image quality and enlarges the edge view of the human eyes, so as to enhance user immersion feelings. At the same time, the use of the focusing thin optical element also greatly reduces the weight of the system, thereby reducing the discomfort caused by the weight when wearing the head-mounted display device.

Other features and advantages of the present invention are explained in the following specifications, which becomes obvious and understandable with the description in the specification and embodiment. The objects and advantages of the present invention are able to be realized by the structure explained and illustrated in the specification, claims and figures.

BRIEF DESCRIPTION OF THE DRAWINGS

In order to better illustrate the technical solutions of the embodiments of the present invention and the conventional technology, a brief introduction of the figures required are listed as below. Obviously, the figures described below are just embodiments of the present invention. For a skilled technician in the field, other figures are able to be obtained based on the figures without innovative effort.

FIGS. 3a-3c are respectively a left view, a top view and a front view of the optical magnifying combination lens according to FIG. 1;

FIG. 4 is a structural view of an optical magnifying combination lens according to a preferred embodiment 2 of the present invention;

FIGS. 5a-5b are sketch views of a peripheral area contour of the optical magnifying combination lens according to different preferred embodiments;

FIG. 6 is a structural view of an optical magnifying combination lens according to a preferred embodiment 3 of the present invention;

FIGS. 7a-7b are sketch views of the optical magnifying combination lens in an optical path according to the preferred embodiment 1;

FIGS. 8a-8b are sketch views of the optical magnifying combination lens in an optical path according to the preferred embodiment 2;

FIG. 9 is a structural view of a head-mounted optical display system according to a preferred embodiment 4 of the present invention;

Figure 1:
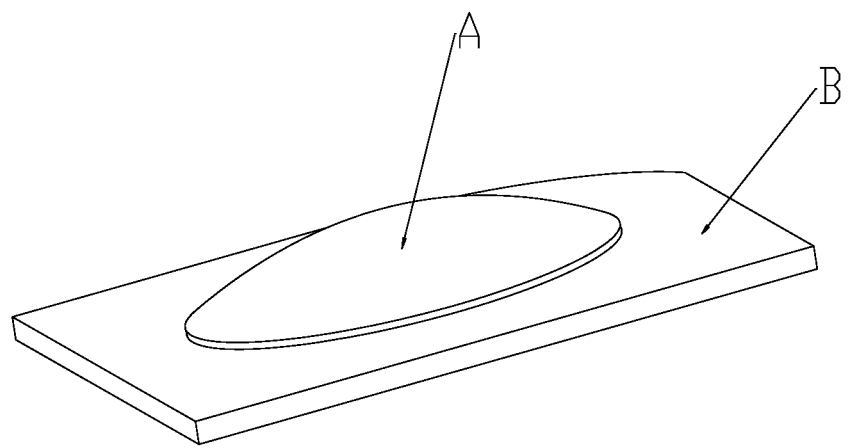
FIG. 1 is a structural view of an optical magnifying combination lens according to a preferred embodiment 1 of the present invention.

element reference: A—central area of optical magnifying combination lens, B—peripheral area of optical magnifying combination lens, 1—image display source, 2—optical magnifying combination lens, 3—focusing thin optical element, 4—convex lens.

DETAILED DESCRIPTION OF THE PREFERRED EMBODIMENT

Referring to the drawings, the technical solutions in the embodiments of the present invention are clearly and fully illustrated. Obviously, the preferred embodiments are just part of the embodiments of the present invention. All the embodiments based on the illustrated embodiments, which are conceived by a skilled technician in the field without innovative efforts, are within the protection range of the present invention.

The optical magnifying combination lens provided by the present invention is mainly designed for a head-mounted virtual reality (VR) display system.

Figure 2:
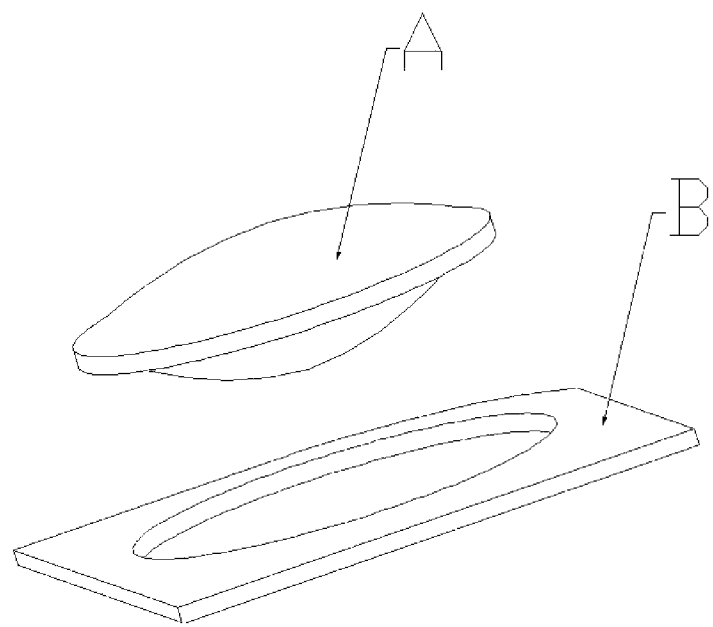
FIG. 2 is an exploded view of the optical magnifying combination lens according to FIG. 1.

Referring to FIGS. 1-3 of the drawings, a structural view of an optical magnifying combination lens according to a preferred embodiment 1 of the present invention is used for further illustrating structures, principles and advantages of the optical magnifying combination lens, wherein the optical magnifying combination lens in FIGS. 1-3 is monocular.

Referring to FIGS. 1-3, the optical magnifying combination lens of the preferred embodiment 1 comprises a central area A and a peripheral area B, wherein an inner diameter of the peripheral area B closely fits an outer diameter of the central area A. The central area A corresponds to main visual field imaging, in such a manner that a VR display system using the optical magnifying combination lens provides superior image quality. The peripheral area B corresponds to peripheral visual field imaging, so as to enlarge a rim visual field of the VR display system.

The central area A is a convex lens (single or double convex) or a combination convex lens. According to different preferred embodiment of the present invention, the convex lens forming the central area A may be an optical lens such as a conventional spherical lens, an aspheric lens, or a free-form surface optical lens, while the present invention is not limited thereto. The combination convex lens refers to a lens group consisted of at least two convex lenses. For example, the combination convex lens can be formed by gluing two circular aspheric lenses together.

In the preferred embodiment 1, the peripheral area B is realized by a focusing thin optical element (i.e., a thin optical element having a focusing function). According to different preferred embodiment of the present invention, the focusing thin optical element may be an optical element such as a Fresnel lens, a Fresnel zone plate, or a binary optical element.

FIG. 4 is a structural view of an optical magnifying combination lens according to a preferred embodiment 2 of the present invention. Referring to FIG. 4, compared with optical magnifying combination lens as shown in FIGS. 1-3, a peripheral area B of an optical magnifying combination lens in the preferred embodiment 2 is an arc substrate Fresnel lens which is concave towards human eyes, wherein a curvature radius of the arc substrate Fresnel lens coincides with a curvature radius of a near-eye side optical surface of a central area A.

The peripheral area B corresponds to the peripheral visual field imaging, and since the peripheral area B is the arc substrate Fresnel lens which is concave to human eyes, the peripheral area B can effectively increase the peripheral visual field and even cover a dynamic visual field of the human eyes, which greatly expands a visual area of near-eye display, and enhances use immersion feelings.

It should be noted that in different embodiments of the present invention, the peripheral contour of the central area A of the optical magnifying combination lens is not limited and may be either circular or rectangular or other irregularly shapes, while the present invention is not limited thereto. At the same time, it should be noted that a hollow area of the peripheral area B needs to be coincident with the peripheral contour of the central area A and can be tightly fitted together, regardless of the shape of the peripheral contour of the central area A.

In addition, the peripheral contour of the peripheral area B is not limited in its shape, and the shape of the peripheral contour of the peripheral area B can be arbitrarily adjusted depending on the application environment (for example, the shape of the peripheral area B may be the same as that of FIG. 5a or FIG. 5b), while the present invention is also not limited thereto.

In the preferred embodiment 2, materials of the central area A and the peripheral area B is the same, and the constituent materials thereof are optical plastic PMMA (polymethyl methacrylate). Of course, in other preferred embodiments of the present invention, the material of the central area A and the peripheral area B may be different, and the present invention is not limited thereto. For example, in a preferred embodiment 3 of the present invention, the central area A is made of the optical plastic PMMA and the peripheral area B is made of E48R (ZEON ZEONEX® E48R Cyclo Olefin Polymer).

When the optical magnifying combination lens provided by the present invention is applied to a head-mounted VR device, it is necessary that focal lengths of the central area A and the peripheral area B of the optical magnifying combination lens match each other when no specific compensation optical element is used (i.e. the focal lengths are close to each other). For example, in the preferred embodiment 3, the focal length difference between the central area A and the peripheral area B is preferably no more than 10 mm.

In the preferred embodiment 3 of the present invention, the central area A of the optical magnifying combination lens may be an aspheric lens and the peripheral area B is a flat substrate Fresnel lens; wherein one side of the peripheral area B is a smooth surface and the other side is engraved with concentric sawtooth rings. When such optical magnifying combination lens is mounted on a head-mounted VR display device, it is preferable that the smooth surface of the peripheral area B faces the human eyes.

In the preferred embodiment 3 of the present invention, an achromatic pattern is engraved on a surface of the convex lens constituting the central area A of the optical magnifying combination lens. That is to say, the central area A of the optical magnifying combination lens may be a folded-off achromatic lens.

In the preferred embodiment 3, the central area A and the peripheral area B of the optical magnifying combination lens are respectively individual optical elements. The contour of the hollow area of the peripheral area B coincides with the peripheral contour of the central area A and can be closely fitted. The central area A and the peripheral area B can be joined together by optical bonding or mechanical combination.

Of course, in other preferred embodiments of the present invention, the optical magnifying combination lens may also be integrally molded, namely the central area A and the peripheral area B are integrally molded, and the present invention is not limited thereto.

The head-mounted VR display device is able to be applied for single or both eyes. The optical magnifying combination lens illustrated in the FIG. 1 to FIG. 5 has one central area, which is able to be applied for single eye or both eyes. For the light path, the binocular head-mounted VR display device requires two set of optical system to match the left and right eyes respectively. For the structure of the product, part of the bilaterally symmetric optical elements of the required two sets (such as the optical magnifying combination lens and the image display source) of the optical system in the binocular head-mounted VR display device are able to be integrally molded which is convenient for production and assembly. When the pupil spacing of the binocular head-mounted VR display device does not require adjustment, as illustrated in the FIG. 6, the left and right optical magnifying combination lens are able to be designed as integrally molded, wherein the optical magnifying combination lens is designed to have two central areas which are bilateral symmetric.

The optical magnifying combination lens is a nonstandard lens. Therefore, FIGS. 7a-7b are sketch views of the optical magnifying combination lens shown in FIGS. 1-3 in an optical path, and Therefore, FIGS. 8a-8b are sketch views of the optical magnifying combination lens shown in FIG. 4 in an optical path.

The present invention provides a head-mounted display optical system which adopts the optical magnifying combination lens. The head-mounted display optical system comprises the image display source and an optical magnifying lens set, wherein the optical magnifying lens set comprises at least one piece of the optical magnifying combination lens. The image display source is applied for display the optical information which reaches the human eyes after being enlarged by the optical magnifying lens set. In different preferred embodiments of the present invention, the image display source may be a single display screen or mobile terminal display In the preferred embodiments of the present invention, the optical magnifying lens set comprises one piece or multiple pieces of intermediate optical elements, wherein the intermediate optical elements may be a focusing thin optical element, a convex lens or a combination of the focusing thin optical element and the convex lens.

When the intermediate optical element is the focusing thin optical element, the focusing thin optical element is set on the distal side of the optical magnifying combination lens from the human eyes. The optical information of the image display source first passes through the focusing thin optical element and then passes through the optical magnifying combination lens before reaches the human eyes.

When the intermediate optical element is the convex lens which is set on the distal side of the optical magnifying combination lens from the human eyes. The optical information displayed by the image display source first passes through the convex lens, then passes through the optical magnifying combination lens before reaches the human eyes. The convex lens is able to be the conventional spherical lens, aspheric lens, free-form surface optical lens or a combination of the conventional lenses.

The below preferred embodiments are illustrated by the FIG. 9 to FIG. 16. The FIG. 9 to FIG. 16 are examples of the binocular head-mounted display optical system. The monocular optical system is able to be produced by choosing one side of the binocular optical system, and there is no need for separated description.

The FIG. 9 is a perspective view of the structure of the binocular head-mounted display optical system of a preferred embodiment 4 according to the present invention.

As illustrated in the FIG. 9, the binocular head-mounted display optical system comprises the image display source 1 (the image display source 1 is able to be one big display screen divided into the left and the right part, or two separated small left and right screens) shared by the left and the right eyes and the left and the right optical magnifying lens sets. Each set of the optical magnifying lens comprises one piece of the optical magnifying combination lens 2. The projected virtual image of optical information displayed by the image display source 1 after being enlarged by the optical magnifying combination lens 2 is received by the human eyes.

Figure 10:
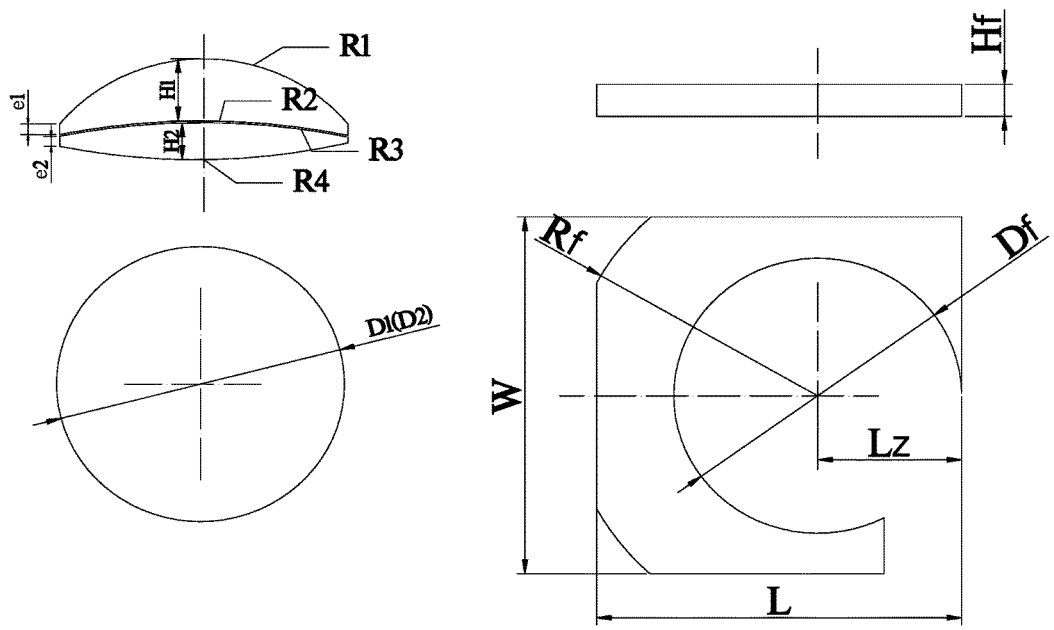
FIG. 10 is a sketch view of optical parameters of a central area and a peripheral area of an optical magnifying combination lens according to FIG. 9.

Referring to FIG. 10, in the preferred embodiment 4, The central lens portion (i.e., the central area A) of the optical magnifying combination lens 2 is formed by bonding two circular aspheric lenses having a uniform diameter, wherein the central area A of a primary lens 21 is a combination convex lens. The peripheral area B is a center-hollowed flat substrate Fresnel lens, wherein one side of the peripheral area B is a smooth surface and the other side is engraved with concentric sawtooth rings.

FIG. 10 illustrates optical parameters of the central lens portion and a peripheral Fresnel lens portion of the optical magnifying combination lens 2, and respective parameters thereof can be referred to as shown in Table 1; wherein an interior edge of the peripheral Fresnel lens portion is glued with an exterior edge of the central lens portion to form an integrated lens by optical gluing.

TABLE 1

| central area A (combination convex lens) | | | | | | | |
|---|---|---|---|---|---|---|---|
| lens 1 | | | | | | | |
| first surface curvature radius R1 | aspheric coefficient | curvature radius R2 | center thickness H1 | edge thickness e1 | diameter D1 | focal length | material |
| 19.85 | K = −2.155 | 468.39 | 14.6 | 2.3 | 54 | 37.1 | PMMA |
| lens 2 | | | | | | | |
| first surface curvature radius R4 | aspheric coefficient | curvature radius R3 | center thickness H2 | edge thickness e2 | diameter D2 | focal length | material |
| 56.47 | K = −2.098 | 468.39 | 8.9 | 1.69 | 54 | 94.8 | Polycarb |
| peripheral Fresnel lens portion | | | | | | | |
| Rf | W | L | Lz | thickness Hf | Df | focal length | material |
| 40 | 70 | 72 | 31 | 3 | 54.05 | 30 | PMMA |

In the preferred embodiment 4, when the optical magnifying combination lens 2 match the parameters listed in the table 1, the focal length of the central area of the main lens and the secondary lens are both 30 mm (the total focal length of the optical magnifying lens is 30 mm). When the image display source 1 is a 6-inch screen, the binocular horizontal field angle of the head-mounted display optical system is around 106 degrees and the diagonal field of view is around 152 degrees.

Figure 11:
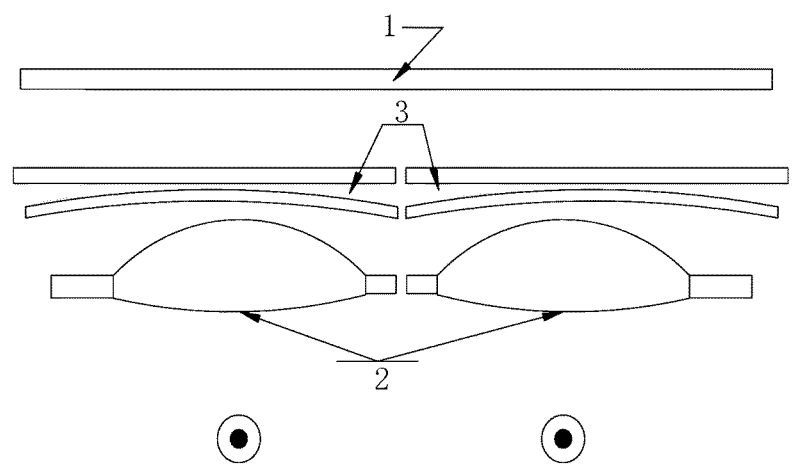
FIG. 11 is a structural view of a head-mounted optical display system according to a preferred embodiment 5 of the present invention.

FIG. 11 is a structural view of a head-mounted optical display system according to a preferred embodiment 5 of the present invention.

As illustrated in the FIG. 11, the binocular head-mounted display optical system comprises an image display source 1 and the left and the right set optical magnifying lens set; wherein each set of the optical magnifying lens comprises one piece of optical magnifying combination lens 2 and two pieces of focusing thin optical element 3. The two pieces of focusing thin optical element 3 are set between the optical magnifying combination lens 2 and the image display source 1. In the embodiment 5, the two pieces of the focusing thin optical element 3 of each set of the optical magnifying lens is able to be one piece of flat substrate Fresnel lens and one piece of arc substrate Fresnel lens. The optical information displayed in the image display source 1 first passes through the focusing thin optical element 3, then passes through the optical magnifying combination lens 2 before reaches the human eyes.

Figure 12:
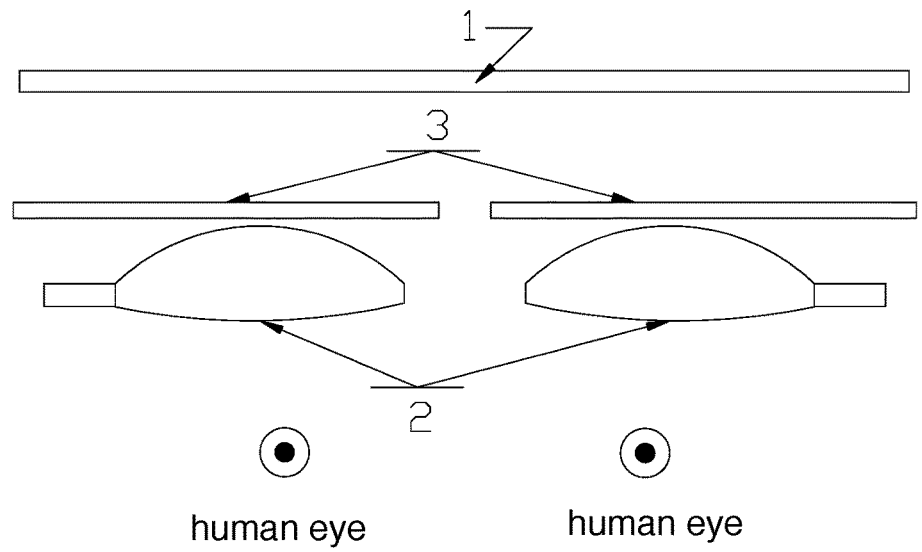
FIG. 12 is a structural view of a head-mounted optical display system according to a preferred embodiment 6 of the present invention.
Figure 13:
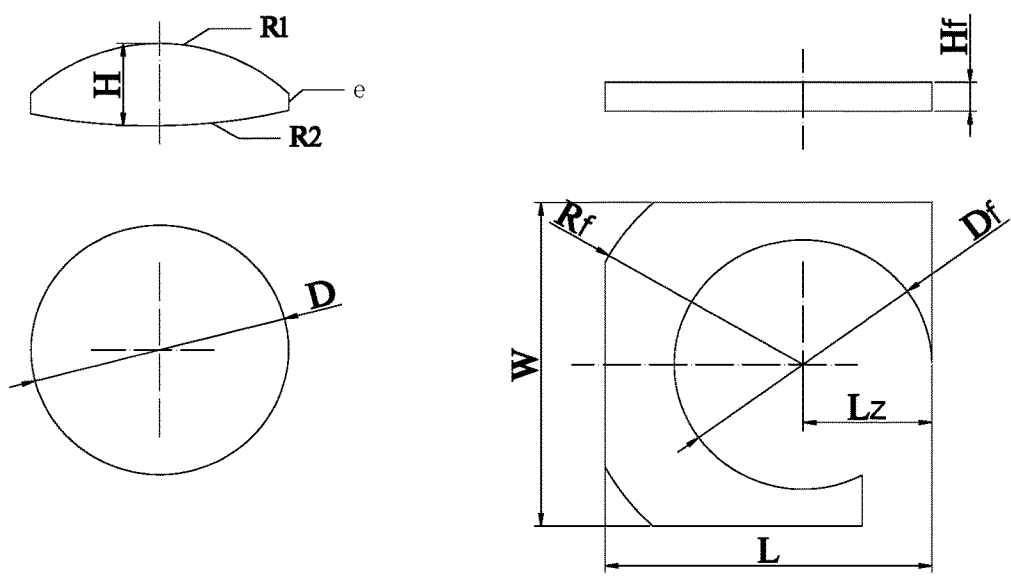
FIG. 13 is a sketch view of optical parameters of a central area and a peripheral area of an optical magnifying combination lens according to FIG. 12.

FIGS. 12-13 illustrate a structure of a head-mounted optical display system according to a preferred embodiment 6 of the present invention As illustrated in the FIG. 12, the binocular head-mounted display optical system comprises an image display source 1 and the left and the right set optical magnifying lens set; wherein each set of the optical magnifying lens comprises one piece of optical magnifying combination lens 2 and one piece of focusing thin optical element 3 (in the preferred embodiment 6, the focusing thin optical element 3 preferably adopts a flat substrate Fresnel lens). The optical information displayed in the image display source 1 first passes through the Fresnel lens 3, then passes through the optical magnifying combination lens 2 before reaches the human eyes.

In the preferred embodiment 6, the central area A of the optical magnifying combination lens 2 is a round aspheric lens, and the peripheral area B is a center-hollowed Fresnel lens. The structures of the aspheric lens part of the optical magnifying combination lens 2 and the peripheral Fresnel lens part are annotated in the FIG. 13. The respective parameters of the aspheric lens and the peripheral Fresnel lens are listed in Table 2.

In the preferred embodiment 6, when the optical magnifying combination lens 2 match the parameters listed in Table 2, focal lengths of the lenses of both the central area A and the peripheral area B are 60 mm, the image display source 1 is a 6-inch screen and the focal length of the Fresnel lens 3 is 55 mm, the total focal length of the optical magnifying lens is 29 mm. The binocular horizontal field angle of the optical system is around 110 degrees and the diagonal field of view is around 160 degrees.

Figure 14:
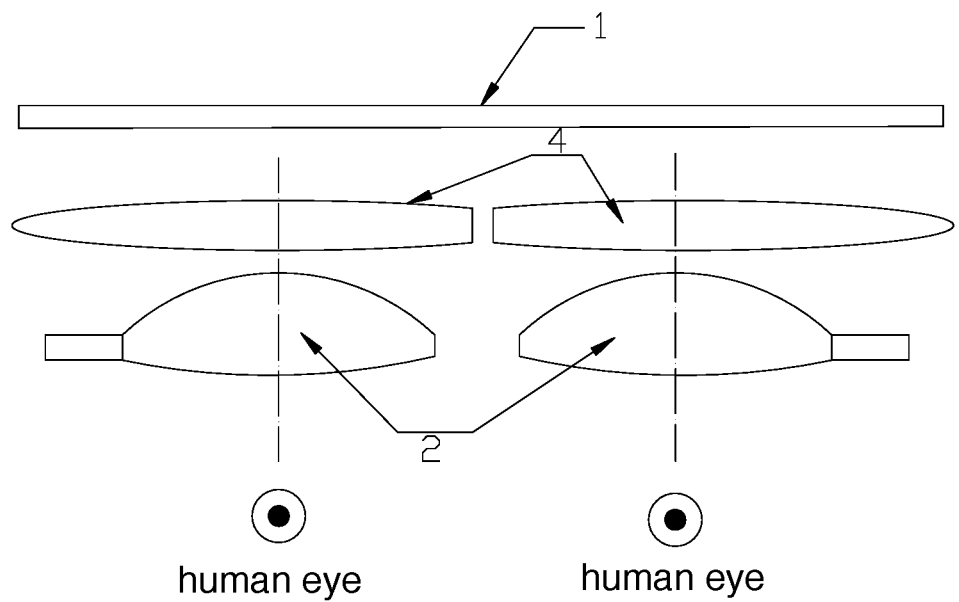
FIG. 14 is a structural view of a head-mounted optical display system according to a preferred embodiment 7 of the present invention.
Figure 15:
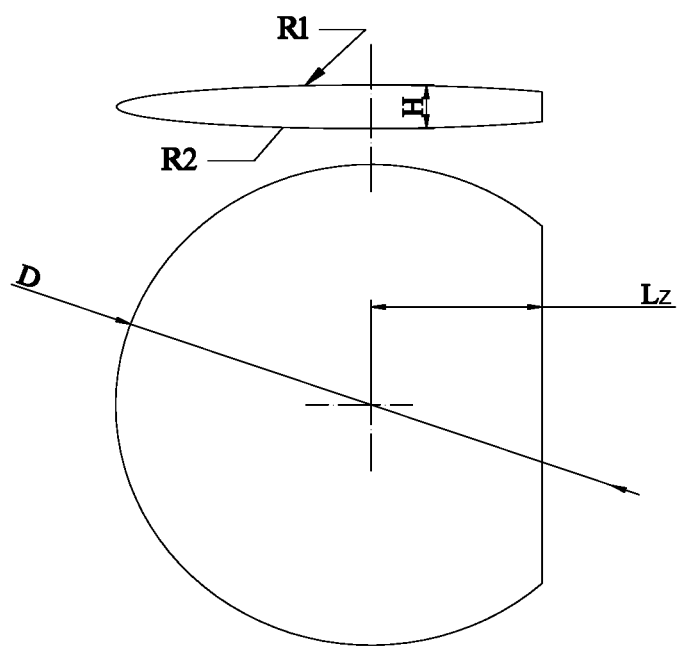
FIG. 15 is a sketch view of optical parameters of a central area and a peripheral area of an optical magnifying combination lens according to FIG. 14.

FIG. 14 is a structural view of a head-mounted optical display system according to a preferred embodiment 7 of the present invention.

As illustrated in the FIG. 14, the binocular head-mounted display optical system comprises an image display source 1 and the left and the right set optical magnifying lens set; wherein each set of the optical magnifying lens comprises one piece of optical magnifying combination lens 2 and one piece of convex lens 4. The optical information displayed in the image display source 1 first passes through the convex lens 4, then passes through the optical magnifying combination lens 2 before reaches the human eyes.

In the preferred embodiment 7, the central area A of the optical magnifying combination lens 2 is a round aspheric lens, and the peripheral area B is a center-hollowed flat substrate Fresnel lens. The structures of the aspheric lens part of the optical magnifying combination lens 2 and the peripheral Fresnel lens part are annotated in the FIG. 13. The respective parameters of the aspheric lens and the peripheral Fresnel lens are listed in Table 3. The convex lens 4 is an aspheric biconvex, the structure is annotated in the FIG. 16 and the respective parameters are listed in Table 4.

TABLE 2

| aspheric lens portion (central area A) | | | | | | | |
|---|---|---|---|---|---|---|---|
| first surface curvature radius R1 | aspheric coefficient | curvature radius R2 | center thickness H | edge thickness e | diameter D | focal length | material |
| 35.72 | K = −0.689 a4 = −0.0000063 | 360 | 11.6 | 2 | 48 | 60 | PMMA |

| peripheral Fresnel lens portion (peripheral area B) | | | | | | | |
|---|---|---|---|---|---|---|---|
| Rf | W | L | Lz | thickness Hf | Df | focal length | material |
| 40 | 70 | 72 | 31 | 2 | 48.05 | 60 | PMMA |

TABLE 3 aspheric lens portion (central area A)

| first surface curvature radius R1 | aspheric coefficient | curvature radius R2 | center thickness H | edge thickness e | diameter D | material | focal length |
|---|---|---|---|---|---|---|---|
| 26.6 | K = −0.9<br>a4 = −3.43E−6<br>a6 = −5.83E−9 | 130.085 | 12.3 | 1.54 | 46 | PMMA | 45.95 | peripheral Fresnel lens portion (peripheral area B)

| Rf | W | L | Lz | thickness Hf | Df | material | focal length |
|---|---|---|---|---|---|---|---|
| 40 | 70 | 72 | 31 | 2 | 46.05 | PMMA | 46 |

TABLE 4 double convex aspheric

| first surface curvature radius R1 | aspheric coefficient | curvature radius R2 | aspheric coefficient | center thickness H | Lz | diameter D | material | focal length |
|---|---|---|---|---|---|---|---|---|
| 120 | K = −0.63 | 120 | K = −0.63 | 15.3 | 31 | 80 | Polycarb | 104.3 |

In the preferred embodiment 7, when the optical magnifying combination lens 2 match the parameters listed in Table 3 and the convex lens 4 matches the parameters listed in the table 4, the total focal length of the optical magnifying lens set is 33.5 mm (the focal length of the convex lens of the optical magnifying combination lens 2 is 45.95 mm; the focal length of the peripheral Fresnel lens of the optical magnifying combination lens 2 is 46 mm and the focal length of the convex lens 4 is 104.3 mm). When the image display source 1 is a 6-inch screen, the calculated binocular horizontal field angle of the optical system is around 90 degrees and the diagonal field of view is around 126 degrees.

Figure 16:
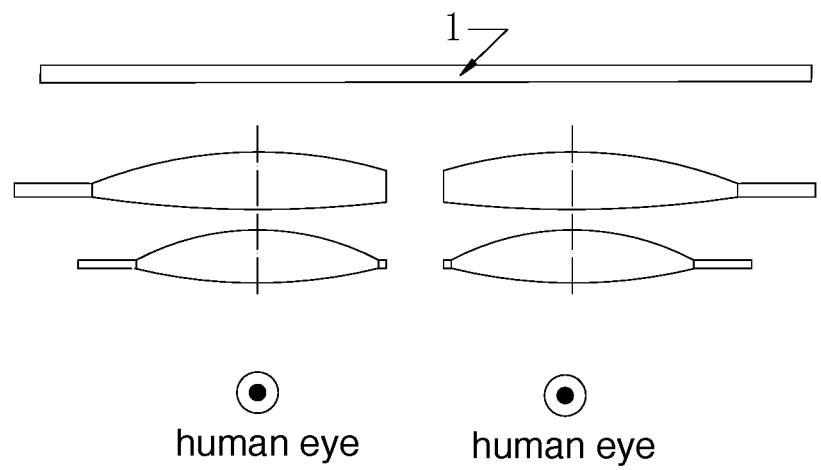
FIG. 16 is a structural view of a head-mounted optical display system according to a preferred embodiment 8 of the present invention.

FIG. 16 is a structural view of a head-mounted optical display system according to a preferred embodiment 8 of the present invention.

As illustrated in the FIG. 16, the binocular head-mounted display optical system comprises an image display source 1 and the left and the right set optical magnifying lens set; wherein each set of the optical magnifying lens comprises two pieces of optical magnifying combination lens vertically stacked together. The optical information displayed in the image display source 1 first passes through the first optical magnifying combination lens, then passes through the second optical magnifying combination lens before reaches the human eyes.

Figure 17:
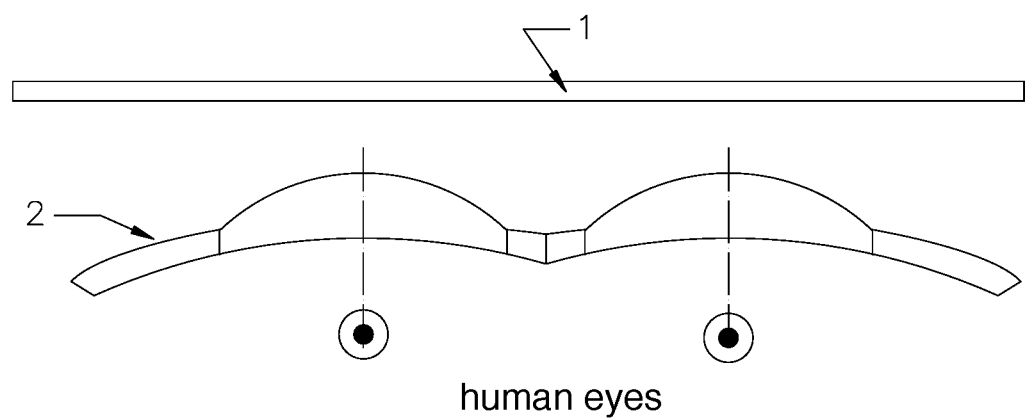
FIG. 17 is a structural view of an optical display system of a binocular head-mounted virtual reality display device according to a preferred embodiment 9 of the present invention.

FIG. 17 is a structural view of a binocular head-mounted virtual reality display device according to a preferred embodiment 9 of the present invention.

Referring to FIG. 17, the binocular head wear optical display system comprises an image display source 1, a left optical magnifying lens group and a right optical magnifying lens group. Each optical magnifying lens group comprises an optical magnifying combination lens 2. Projection virtual image of optical information displayed by the image display source 1 is received by human eyes after being magnified by the optical magnifying combination lens 2. The image display source 1 may be a flat screen or a curved screen, preferably a curved screen. The image display source 1 can be formed by a left screen and a right screen, or is a whole screen divided into a left display part and a right display part. The optical magnifying combination lens 2 is an arc substrate Fresnel lens whose peripheral area is concave towards the human eyes.

Figure 18:
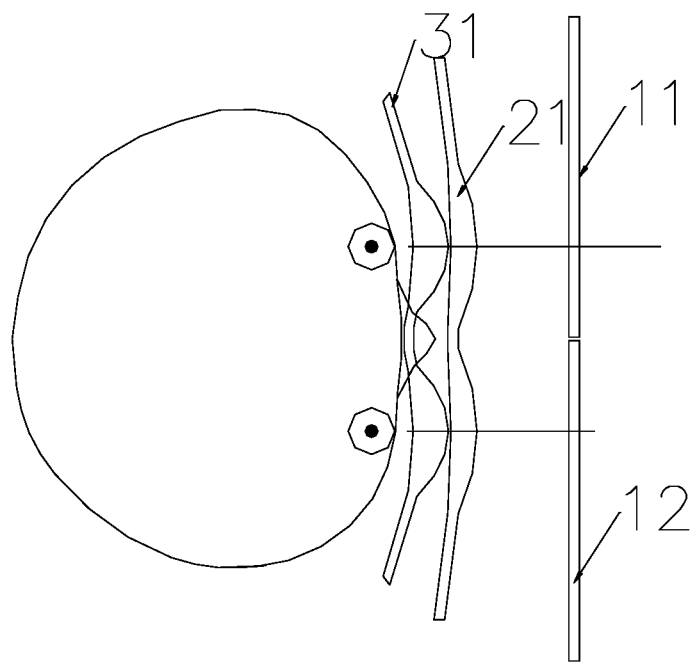
FIG. 18 is a structural view of an optical display system of a binocular head-mounted virtual reality display device according to a preferred embodiment 10 of the present invention.

FIG. 18 is a structural view of a binocular head-mounted virtual reality display device according to a preferred embodiment 10 of the present invention.

Referring to FIG. 18, the binocular head-mounted optical display system comprises a left image display 11, a right image display source 12, a left optical magnifying lens group and a right optical magnifying lens group. Each optical magnifying lens group comprises two optical magnifying combination lenses 21 and 31 stacked along an optical path (combination lens in the preferred embodiment 10 is the optical magnifying combination lens described in the preferred embodiment 9).

The optical magnifying combination lenses 21 and 31 both comprise a central area A and a peripheral area B, wherein the central area A is a convex lens or a combination convex lens. The convex lens is a spherical lens, an aspheric lens, or a free-form surface optical lens. The peripheral area B is an arc substrate Fresnel lens which is concave towards human eyes. The central area A corresponds to main visual field imaging, and the peripheral area B corresponds to the peripheral visual field imaging. According to the two combination lenses, a difference between a combination focal length of central area lenses and a combination focal length of the peripheral areas is no more than 10 mm.

According to the preferred embodiment 10, the binocular head-mounted virtual reality display device adopts two combination lenses, in such a manner that positions of an optical object side main surface and an optical image side main surface of the lens group formed by combining the central area convex lenses are substantially the same as that of the lens group formed by combining the peripheral area arc substrate Fresnel lenses. At the same time, the focal length of the lens group formed by combining the central area convex lenses are substantially the same as that of the lens group formed by combining the peripheral area arc substrate Fresnel lenses (in the preferred embodiment 10, the difference therebetween is no more than 10 mm). As a result, it is ensured that in the image display source, a projection distance and a display size of images projected and magnified by the central convex lens and the peripheral arc substrate Fresnel lens are equivalent.

Figure 19:
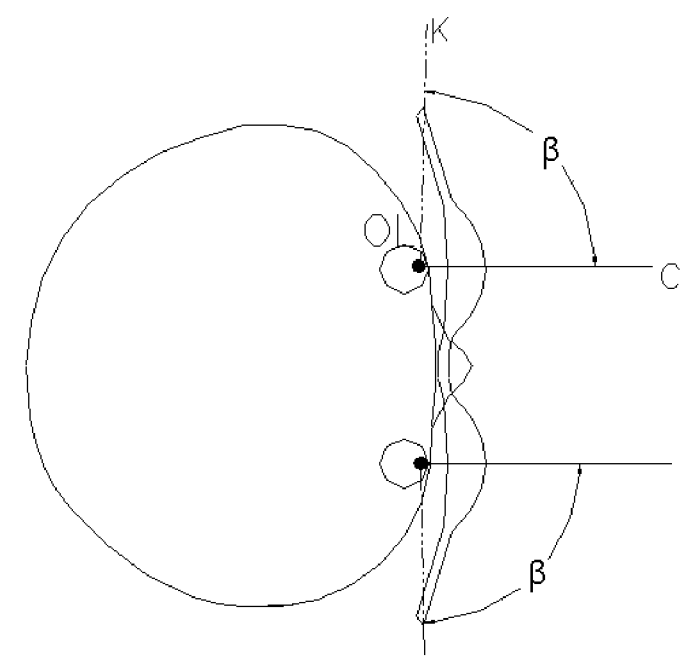
FIG. 19 is a sketch view of an angle formed between a line connecting an edge of a combination lens and a corresponding center point of human eyes, and a visual sight line of the center point.

According to the preferred embodiment 10, the peripheral area of each of the two combination lenses is the arc substrate Fresnel lens which is concave towards human eyes and covers vision of the human eyes to a certain extent. When the head does not move and the eyes rotate, a horizontal sight range of the human eyes are shown in FIG. 19, wherein monocular horizontal sight range is about 94°-104° (which slightly differs from person to person). Therefore, an angle β (the angle β shown in FIG. 19) formed between a line connecting an edge of each of the optical magnifying combination lens with a corresponding center point of the human eyes and a central sight line of the human eyes is 70-100 degrees. The angle can basically cover the human visual field, especially when being set to 90°-100°, the angle can completely cover the human visual field. In FIG. 19, a straight line OLK is a line connecting an edge of a left combination lens with a center point of a left eye, while a line OLC is a central sight line of the left eye, wherein β is the angle between the two lines.

It should be noted that the central areas and the peripheral areas of the optical magnifying combination lenses 21 and 31 may be integrally molded or individual optical elements. When being the individual optical elements, the central area and the peripheral area are joined together by optical bonding or mechanical combination.

Meanwhile, when the central area and the peripheral area are individual optical elements, it is preferred that a peripheral contour of the central area is tapered, and an interior contour of the peripheral area is also tapered, so as to coincide with the peripheral contour of the central area.

Figure 20:
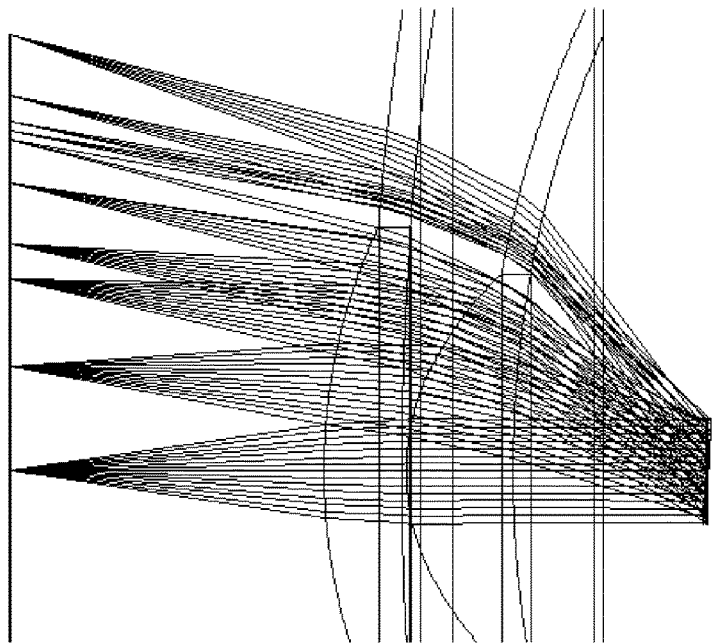
FIG. 20 is an imaging optical path of a light from an image source after passing two combination lenses when a peripheral contour of a central area lens is circular.
Figure 21:
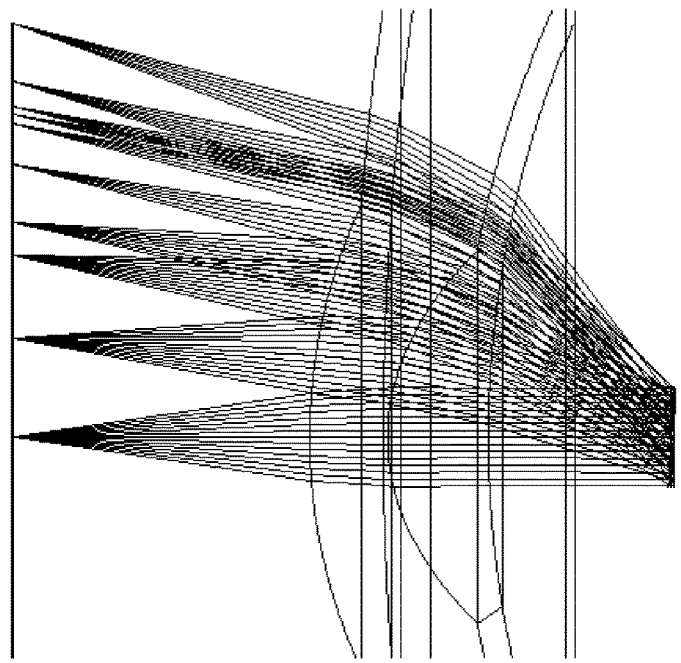
FIG. 21 is an imaging optical path of a light from an image source after passing two combination lenses when a peripheral contour of a central area lens is tapered.

FIG. 20 is an imaging optical path of a light from an image source after passing two combination lenses when a peripheral contour of a central area lens is circular. FIG. 21 is an imaging optical path of a light from an image source after passing two combination lenses when a peripheral contour of a central area lens is tapered. It can be clearly seen from these two drawings that when the peripheral contour of the central area lens is tapered, boundary vision interference is significantly smaller. Therefore, from human visual perspective, the tapered contour on the one hand can greatly reduce the visual interference between the central area and the peripheral, on the other hand can maximize utilization of primary and secondary lens diameters, as well as improve light transmittance.

According to the preferred embodiment 10 as shown in FIG. 18, no matter the central area and the peripheral area of the optical magnifying combination lens are integrally molded or individual optical elements, in order to further solve a splicing line problem between the central area and the peripheral area, the curvature radius of the arc substrate Fresnel lens forming the peripheral can always be designed to match with the curvature radius of the near-eye side optical surface of the central area.

Figure 22:
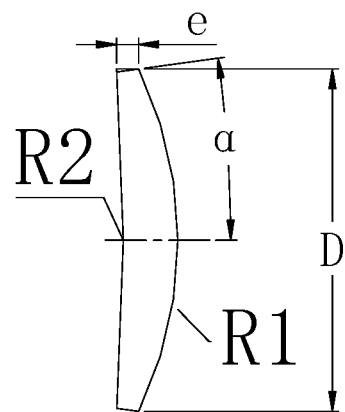
FIG. 22 indicates a central area structure of an optical magnifying combination lens as shown in FIG. 18.
Figure 23:
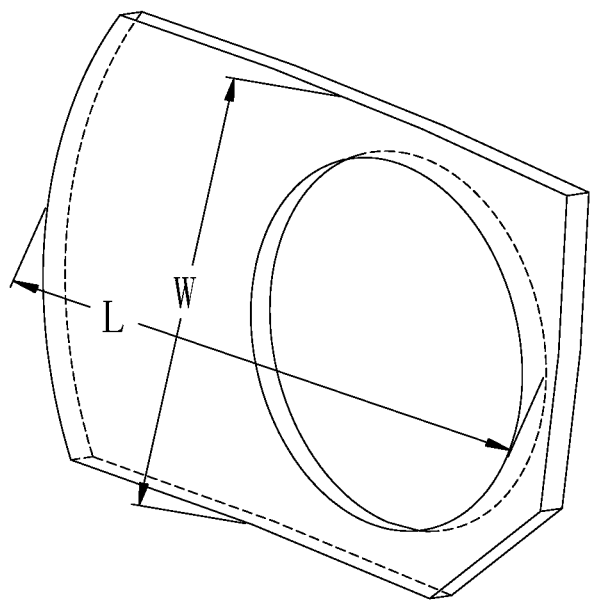
FIG. 23 indicates a peripheral area structure of the optical magnifying combination lens as shown in FIG. 18.

According to the preferred embodiment 10 as shown in FIG. 18, if the image display source adopts two 5-inch 1080p LCD screens as image display carriers (i.e. the image display sources 11 and 12 in FIG. 18), a binocular resolution is up to 1920*1080 pixels. FIG. 22 indicates a central area structure of the optical magnifying combination lenses 21 and 31, and FIG. 23 indicates a peripheral area structure.

When structural parameters of the optical magnifying combination lens 21 satisfy Table 5, structural parameters of the optical magnifying combination lens 31 satisfy Table 6, a combination lens focal length of the optical magnifying combination lenses 21 and 31 is 40.8 mm, and a combination focal length of the peripheral Fresnel lenses is 43 mm, then a horizontal visible angle of a projected image viewed by the combination central area is about 90 degrees, and that view by the combination peripheral Fresnel lens is about 176 degrees.

TABLE 5

| central area lens | | | | | |
|---|---|---|---|---|---|
| first surface curvature radius R1 | curvature radius R2 | edge thickness e | diameter D | α | material |
| 66 | 366 | 3.64 | 57 | 7.9 | POLYCARB |

| peripheral arc substrate Fresnel lens | | | | |
|---|---|---|---|---|
| arc substrate curvature radius | substrate thickness H | horizontal length L | vertical width W | material |
| 366 | 3.64 | 97 | 70 | POLYCARB |

TABLE 6

| central area lens | | | | | | |
|---|---|---|---|---|---|---|
| first surface curvature radius R1 | aspheric coefficient | curvature radius R2 | edge thickness e | diameter D | α | material |
| 25 | K = −0.6<br>A2 = −6.38e−7<br>A4 = 1e−11 | 126 | 3.33 | 45 | 33 | E48R |

| peripheral arc substrate Fresnel lens | | | | |
|---|---|---|---|---|
| arc substrate curvature radius | substrate thickness H | horizontal length L | vertical width W | material |
| 126 | 3.33 | 87 | 70 | E48R |

Accordingly, in Tables 5 and 6, a represents inclination of a tapered edge of the central area lens, which is an angle between the tapered edge and an optical axis of the central area lens.

According to the optical magnifying combination lens of the preferred embodiment 10, the conventional lens is combined with the arc substrate Fresnel lens for the head-mounted virtual reality display device. The optical magnifying combination lens guarantees center image quality and enlarges the edge view of the human eyes (wherein a user feels a screen is borderless), so as to enhance user immersion feelings. In addition, the use of the arc substrate Fresnel lens also greatly reduces the weight of the head-mounted virtual reality display device, thereby reducing the discomfort caused by the weight when wearing the head-mounted display device.

In order to fulfill certain specific needs, the optical elements in the head-mounted display optical system provided by the preferred embodiments may be selectively processed with anti-reflective coating, hard coating and anti-fog coating.

The present invention provides a specially designed optical magnifying combination lens which greatly enlarges the visual field of an image display system. When the optical magnifying combination lens is applied to a binocular head-mounted virtual reality display device whose image display source has a left screen and a right screen for presenting images with optical parallax, the user can have a more realistic experience of the stereoscopic vision with great impact and ultimate shock effect.

Meanwhile, the present invention overcomes problems such as limitation of the visual field of the display system when the conventional lens (spherical, aspheric or free-form surface) is used alone as a magnifying lens for a head-mounted display device due to a small diameter, impaired immersion felt by the human eyes, heavy magnifying lens group, and uncomfortable wearing.

In addition, the focusing thin optical element provided by the present invention comprises a thin optical element having a focusing function, such as a Fresnel lens, a Fresnel zone plate and a binary element. These components are light but with slightly worse image quality. The present invention combines the focusing thin optical element with conventional lens, which guarantees center image quality and enlarges the edge view of the human eyes, so as to enhance user immersion feelings. At the same time, the use of the focusing thin optical element also greatly reduces the weight of the system, thereby reducing the discomfort caused by the weight when wearing the head-mounted display device.

The features, methods and procedures disclosed in the present invention are able to be combined arbitrarily except the conflicted features and/or steps.

Any features disclosed in the specifications (including any extra claims, abstracts and drawings) are able to be replaced with features with similar effects and function except explained otherwise, that is except being explained otherwise, every feature is just an example for a series feature with similar effects.

The present invention is not limited by the embodiments. The present invention is able to be extended to any new features and methods or new combinations of the features and methods disclosed in the specifications.

What is claimed is:

1. An optical magnifying combination lens for utilization in a head-mounted virtual reality display device, comprising: a central area and a peripheral area, wherein the central area is a convex lens or a combination convex lens, and the peripheral area is a focusing thin optical element which is a focusing optical element with a diameter-thickness ratio of no less than 10; the central area corresponds to main visual field imaging, and the peripheral area corresponds to peripheral visual field imaging.

2. The optical magnifying combination lens, as recited in claim 1, wherein the convex lens is a spherical lens or an aspheric lens; and/or the focusing thin optical element is a Fresnel lens, a Fresnel zone plate or a binary element.

3. The optical magnifying combination lens, as recited in claim 2, wherein the peripheral area is an arc substrate Fresnel lens which is concave towards human eyes.

4. The optical magnifying combination lens, as recited in claim 3, wherein a curvature radius of the arc substrate Fresnel lens coincides with a curvature radius of a near-eye side optical surface of the central area.

5. The optical magnifying combination lens, as recited in claim 3, wherein the central area and the peripheral area are integrally molded.

6. A head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited in claim 5.

7. The optical magnifying combination lens, as recited in claim 3, wherein the central area and the peripheral area are individual optical elements; a peripheral contour of the central area is tapered, and an interior contour of the peripheral area is tapered, so as to coincide with the peripheral contour of the central area; wherein the central area and the peripheral area are joined together by optical bonding or mechanical combination.

8. A head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited in claim 7.

9. The optical magnifying combination lens, as recited in claim 2, wherein
the convex lens is an aspheric lens; and/or
the peripheral area is a flat substrate Fresnel lens; wherein one side of the peripheral area is a smooth surface and the other side is engraved with concentric sawtooth rings.

10. The optical magnifying combination lens, as recited in claim 9, wherein the central area and the peripheral area are integrally molded.

11. A head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited in claim 10.

12. The optical magnifying combination lens, as recited in claim 9, wherein the central area and the peripheral area are individual optical elements; a peripheral contour of the central area is tapered, and an interior contour of the peripheral area is tapered, so as to coincide with the peripheral contour of the central area; wherein the central area and the peripheral area are joined together by optical bonding or mechanical combination.

13. A head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited in claim 12.

14. The optical magnifying combination lens, as recited in claim 2, wherein a focal length difference between the central area and the peripheral area is no more than 10 mm.

15. The optical magnifying combination lens, as recited in claim 2, wherein an achromatic pattern is engraved on a surface of the convex lens.

16. A head-mounted optical display system, comprising: an image display source and an optical magnifying lens group; wherein the image display source displays optical information, and the optical information is magnified by the optical magnifying lens group to generate a projection virtual image which is then received by human eyes; wherein the optical magnifying lens group comprises at least one optical magnifying combination lens as recited in claim 1.

17. The head-mounted optical display system, as recited in claim 16, wherein an angle formed between a line connecting an edge of each of the optical magnifying combination lens with a corresponding center point of the human eyes and a central sight line of the human eyes is 70-100 degrees.

18. The head-mounted optical display system, as recited in claim 16, wherein the optical magnifying lens group further comprises:
one or more intermediate optical elements, wherein the intermediate optical elements are located on a side of the optical amplifying combination lens which is far from the human eyes, and the optical information of the image display source passes through the intermediate optical elements before entering the human eyes.

19. The head-mounted optical display system, as recited in claim 18, wherein the intermediate optical elements comprise focusing thin optical elements or convex lenses.

20. A head-mounted virtual reality display system, comprising: one or two groups of head-mounted optical display systems as recited in claim 16.

* * * * *